United States Patent
Gesell et al.

(10) Patent No.: US 9,821,628 B2
(45) Date of Patent: Nov. 21, 2017

(54) VEHICLE AIR CONDITIONER

(71) Applicant: VALEO KLIMASYSTEME GMBH, Bad Rodach (DE)

(72) Inventors: Bodo Gesell, Schaafheim (DE); Stefan Gartner, Bad Rodach (DE)

(73) Assignee: VALEO KLIMASYSTEME GMBH, Bad Rodach (DE)

( * ) Notice: Subject to any disclaimer, the term of this patent is extended or adjusted under 35 U.S.C. 154(b) by 126 days.

(21) Appl. No.: 14/442,284

(22) PCT Filed: Nov. 8, 2013

(86) PCT No.: PCT/EP2013/073427
§ 371 (c)(1),
(2) Date: May 12, 2015

(87) PCT Pub. No.: WO2014/076017
PCT Pub. Date: May 22, 2014

(65) Prior Publication Data
US 2016/0272037 A1     Sep. 22, 2016

(30) Foreign Application Priority Data
Nov. 13, 2012  (DE) .......................... 10 2012 022 214

(51) Int. Cl.
*B60H 1/00* (2006.01)
(52) U.S. Cl.
CPC ..... *B60H 1/00064* (2013.01); *B60H 1/00842* (2013.01); *B60H 2001/002* (2013.01);
(Continued)
(58) Field of Classification Search
CPC ............ B60H 1/00064; B60H 1/00842; B60H 2001/00135; B60H 2001/00164;
(Continued)

(56) References Cited

U.S. PATENT DOCUMENTS 4,453,591 A * 6/1984 Fehr ................... B60H 1/00064
165/202
2003/0037918 A1* 2/2003 Lee ..................... B60H 1/00064
165/202
(Continued)

FOREIGN PATENT DOCUMENTS

DE       100 44 433 A1    4/2002
EP       1 205 321 A2     5/2002
(Continued)

OTHER PUBLICATIONS

International Search Report issued in PCT/EP2013/073427 dated Jan. 27, 2014 (3 pages).

*Primary Examiner* — Mohammad M Ali
(74) *Attorney, Agent, or Firm* — Osha Liang LLP

(57) ABSTRACT

The invention relates to a vehicle air conditioner (10), with an evaporator (12) for supplying cold air (14) which can be fed to a vehicle interior (16), an air-mixing region (18) which is connected downstream of the evaporator (12) and can supply mixed air at a predeterminable temperature, a first ventilation duct (20) which is connected to the air-mixing region (18) and can conduct mixed air from the air-mixing region (18) into a front region (22) of the vehicle interior (16), and a second ventilation duct (24) which is connected to the air-mixing region (18) and can conduct mixed air from the air-mixing region (18) into a rear region (26) of the vehicle interior (16), wherein, in addition, a separate cold air duct (28), which can feed cold air (14), which is supplied by the evaporator (12), to the vehicle interior (16) in substantially unmixed form is provided.

12 Claims, 1 Drawing Sheet

(52) U.S. Cl.
CPC .............. *B60H 2001/00135* (2013.01); *B60H 2001/00164* (2013.01)

(58) Field of Classification Search
CPC .... B60H 2001/002; B60H 2001/00099; B60H 2001/00078; B60H 2001/00092; B60H 2001/00107; B60H 2001/00114; B60H 2001/00185; B60H 1/00642; B60H 1/0065; B60H 1/00964
USPC .......................................................... 62/244
See application file for complete search history.

(56) References Cited

U.S. PATENT DOCUMENTS

| | | | | |
|---|---|---|---|---|
| 2004/0194948 | A1* | 10/2004 | Shibata | B60H 1/00064 165/204 |
| 2005/0257925 | A1* | 11/2005 | Koukouravas | B60H 1/00064 165/202 |
| 2007/0137833 | A1* | 6/2007 | Kang | B60H 1/00064 165/42 |
| 2007/0266726 | A1* | 11/2007 | Tada | B60H 1/00064 62/331 |
| 2008/0035322 | A1* | 2/2008 | Klein | B60H 1/00064 165/203 |
| 2008/0223546 | A1* | 9/2008 | Lee | B60H 1/00064 165/43 |
| 2011/0005717 | A1* | 1/2011 | Nanaumi | B60H 1/00064 165/61 |
| 2011/0005719 | A1* | 1/2011 | Seto | B60H 1/00064 165/61 |

FOREIGN PATENT DOCUMENTS

| | | |
|---|---|---|
| EP | 1 393 938 A2 | 3/2004 |
| EP | 1 405 743 A2 | 4/2004 |
| JP | H10-100662 A | 4/1998 |
| JP | 2005/161970 A | 6/2005 |
| WO | 2004/014677 A1 | 2/2004 |

* cited by examiner

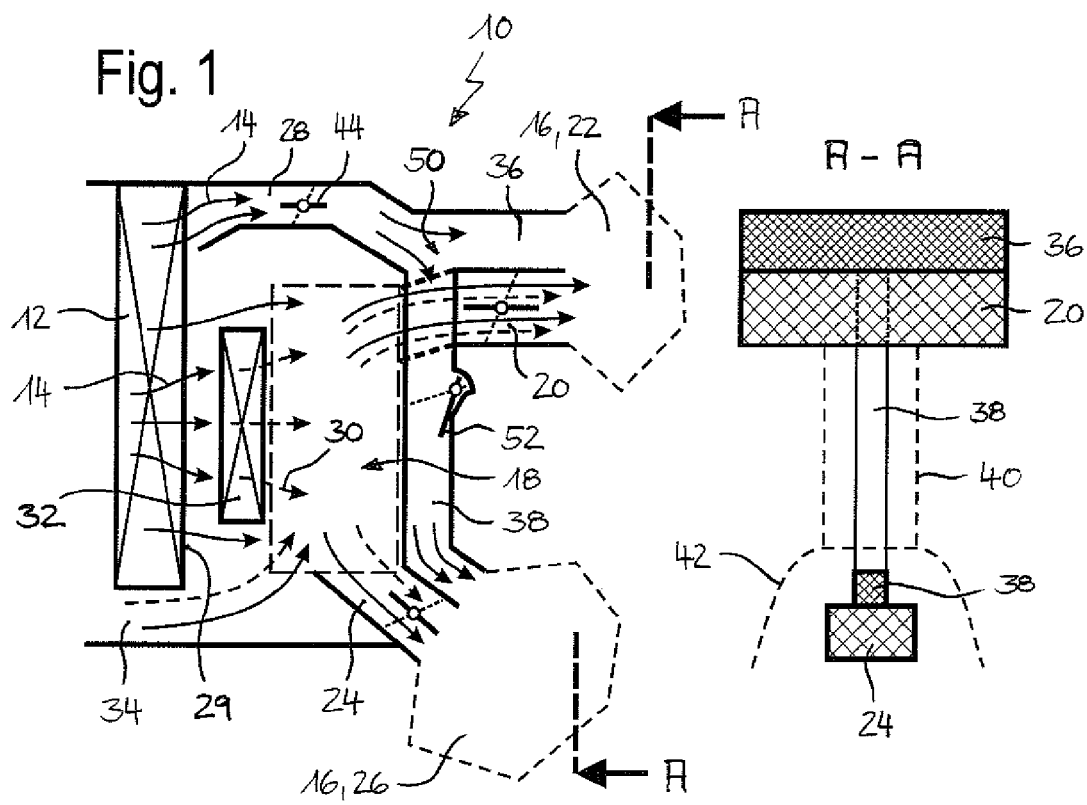
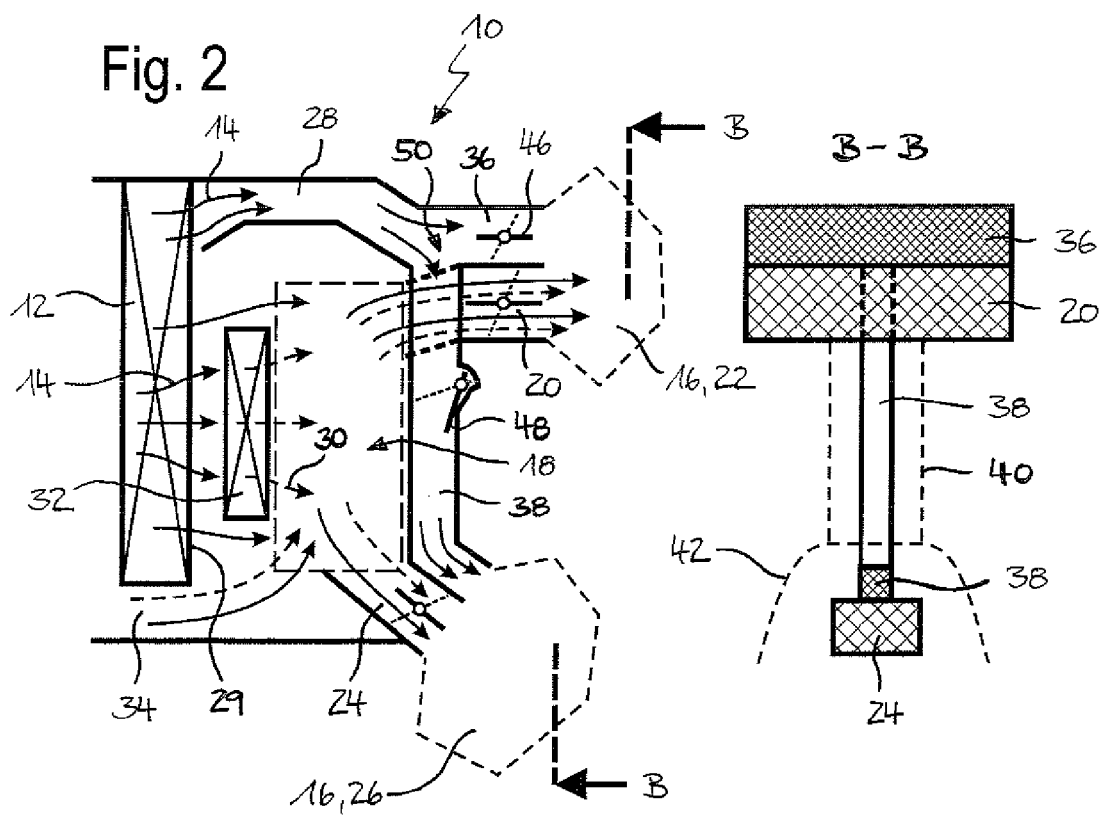

VEHICLE AIR CONDITIONER

The invention relates to a vehicle air conditioner.

Modern motor vehicles are customarily nowadays equipped with an air conditioner for ventilating, air-conditioning and/or dehumidifying a vehicle interior.

As a rule, such a vehicle air conditioner comprises an evaporator for supplying cold air and a heating device for supplying warm air. The cold air, the warm air and, under some circumstances, fresh air from the vehicle surroundings and/or recycled air from the vehicle interior flow here into an air-mixing region which supplies mixed air at a predeterminable temperature and introduces said mixed air via a plurality of air diffusers into the vehicle interior in order to set a desired temperature there.

In addition, the prior art has already disclosed vehicle air conditioners with what is referred to as zone air-conditioning, in which the temperature in the vehicle interior can be set "zone by zone" and therefore can be adapted, for example, to different temperature requirements of a driver and of the front passenger.

However, on cold winter days with strong insolation, a generally pleasant mixed air temperature of the vehicle air conditioner that is required, for example, in the foot well may be perceived to be too hot in the head and chest region because of the additional insolation.

It is therefore the object of the invention to provide a vehicle air conditioner in which a global temperature setting can be locally changed, in particular reduced, with little outlay.

This object is achieved according to the invention by a vehicle air conditioner, with an evaporator for supplying cold air which can be fed to a vehicle interior, an air-mixing region which is connected downstream of the evaporator and can supply mixed air at a predeterminable temperature, a first ventilation duct which is connected to the air-mixing region and can conduct mixed air from the air-mixing region into a front region of the vehicle interior, and a second ventilation duct which is connected to the air-mixing region and can conduct mixed air from the air-mixing region into a rear region of the vehicle interior, wherein, in addition, a separate cold air duct is provided, which can feed cold air, which is supplied by the evaporator, to the vehicle interior in substantially unmixed form. Cold air can be fed locally via such a cold air duct, by connected air diffusers, with little structural outlay without changing the global temperature setting and therefore the mixed air temperature. Thus, at low external temperatures and with simultaneous strong insolation, cold air supplied, for example, by the evaporator can be blown in in the head and/or chest region without having to lower the temperature in the foot well. This functionality of the air conditioner is perceived as a significant gain in comfort by the vehicle occupants.

At least one control element for adjusting the cold air stream was preferably provided in the cold air duct. By means of said separate control element, which is designed, for example, as a control flap, it can be individually determined whether the predetermined mixed air temperature should be lowered locally.

In a preferred embodiment of the vehicle air conditioner, the cold air duct branches into a first cold-air partial duct which can conduct cold air from the evaporator into a front region of the vehicle interior, and into a second cold-air partial duct which can conduct cold air from the evaporator into a rear region of the vehicle interior. By this means, the gain in comfort described above can also be transmitted to passengers in the vehicle rear with little technical outlay.

In this embodiment, the second cold-air partial duct can extend downward, for example, in the region of a central console of the vehicle and rearwards in a central tunnel of the vehicle into the rear region of the vehicle interior. The central tunnel is, for example, a propeller-shaft tunnel or gearbox tunnel in which the cold air is guided centrally via the second cold-air partial duct rearwards into the vehicle rear and is optionally distributed there to a plurality of air diffusers or air diffusion openings. The required construction space and the outlay on the cold-air guidance are thereby kept correspondingly low.

A control element for adjusting the cold air stream can be provided in the cold air duct between the evaporator and a duct-branching point. Via said control element, in particular a control flap, the function of the local narrowing of the temperature can be activated or deactivated centrally for the entire vehicle interior.

As an alternative or in addition, a control element, in particular a control flap, for adjusting the cold air stream can also be provided in the first cold-air partial duct and/or in the second cold-air partial duct. Via such a control element in the cold-air partial duct, the function of the local narrowing of the temperature can be activated or deactivated separately in each case for the front region and the rear region of the vehicle interior.

In a further embodiment of the vehicle air conditioner, a nonreturn valve is provided in the second cold-air partial duct. Said nonreturn valve takes up an open position in the event of an air stream in the direction of the rear region of the vehicle interior and a closed position in the event of an opposed air stream. This ensures that air from the rear region does not undesirably pass into the front region of the vehicle.

In a further embodiment of the vehicle air conditioner, in order to heat air which can be fed to a vehicle interior, a heating device which can supply warm air and feed the latter to the air-mixing region is provided. Said heating device is helpful for achieving the predetermined mixed air temperature, in particular at low external temperatures.

The heating device here can be connected in particular downstream of the evaporator. This permits, firstly, an advantageous dehumidifying of the mixed air fed to the vehicle interior and, secondly, reheating of the cold air supplied by the evaporator.

Furthermore, a bypass duct which can feed fresh air and/or recycled air to the air-mixing region, bypassing the evaporator, is preferably provided. Fresh air and/or recycled air can thereby be additionally admixed with the cold air of the evaporator and/or the warm air of the heating device in order to achieve a desired mixed air temperature. This results in particularly energy-efficient operation of the vehicle air conditioner.

Further features and advantages of the invention emerge from the description below are preferred embodiments with reference to the drawings, in which:

FIG. 1 shows two diagrammatic sections through a first embodiment of a vehicle air conditioner according to the invention; and FIG. 2 shows two diagrammatic sections through a second embodiment of a vehicle air conditioner according to the invention.

FIGS. 1 and 2 each show, on the left-hand side, a diagrammatic cutout of a vehicle air conditioner 10 with an evaporator 12 for supplying cold air 14, which can be fed to a vehicle interior 16, an air-mixing region 18 which is connected downstream of the evaporator 12 and can supply mixed air having a predeterminable temperature, a first ventilation duct 20 which is connected to the air-mixing region 18 and can conduct mixed air from the air-mixing region 18 into a front region 22 of the vehicle interior 16, and a second ventilation duct 24 which is connected to the air-mixing region 18 and can conduct mixed air from the air-mixing region 18 into a rear region 26 of the vehicle interior 16. In addition, a separate cold air duct 28 which can feed cold air 14, which is supplied by the evaporator 12, to the vehicle interior 16 in substantially unmixed form is provided.

In this case, "in substantially unmixed form" means that the cold air duct 28 extends over the vicinity of a stream-remote side 29 of the evaporator 12 such that an inflow of mixed air and/or warm air 30 between the evaporator 12 and the cold air duct 28 is possible only to a negligible extent, if at all.

In order to heat air which can be fed to the vehicle interior 16, the vehicle air conditioner 10 comprises a heating device 32 which can supply warm air 30 and feed the latter to the air-mixing region 18.

In the exemplary embodiments illustrated, the heating device 32 is connected downstream of the evaporator 12, thus enabling the cold air 14 supplied by the evaporator 12 to be reheated. Accordingly, dehumidifying of the mixed air fed to the vehicle interior 16 can thus also be realized in a simple manner with the vehicle air conditioner 10.

According to FIGS. 1 and 2, a bypass duct 34 which can feed fresh air from the surroundings of the vehicle and/or recycled air from the vehicle interior 16 to the air-mixing region 18, bypassing the evaporator 12, is also provided.

For better differentiation, the cold air 14 is illustrated in the figures by means of solid arrows and the warm air 30 by means of dashed arrows.

According to FIGS. 1 and 2, the cold air duct 28 branches into a first cold-air partial duct 36 which can conduct cold air 14 from the evaporator 12 into the front region 22 of the vehicle interior 16, and a second cold-air partial duct 38 which can conduct cold air 14 from the evaporator 12 into the rear region 26 of the vehicle interior 16. Accordingly, with the vehicle air conditioner 10 illustrated, the advantageous function, mentioned at the beginning, of local lowering of the temperature both in the front region 22 and in the rear region 26 of the vehicle interior 16 can be realized.

In the installed state of the vehicle air conditioner 10, the second cold-air partial duct 38 extends downwards in the region of a central console 40 of the vehicle and rearwards in a central tunnel 42 of the vehicle into the rear region 26 of the vehicle interior 16, as can be seen in the diagrammatic sections A-A and B-B of FIGS. 1 and 2. The central tunnel 42 is, for example, a propeller-shaft tunnel or gearbox tunnel into which cold air 14 is guided centrally by the second cold-air partial duct 38 rearwards into the vehicle rear and is optionally distributed there to a plurality of air diffusers or air diffusion openings. The desired local lowering of the temperature can thereby also be realized in the rear region 26 of the vehicle with little technical outlay and little requirement for construction space. This constitutes a significant gain in comfort for passengers in the vehicle rear.

In order to be able to actively influence a cold air stream of the cold air duct 28, at least one control element 44, 46, 48 for adjusting the cold air stream is provided according to FIGS. 1 and 2. The control elements 44, 46, 48 are, for example, control flaps which preferably can be actuated manually by the vehicle occupants. The control elements 44, 46, 48 here can preferably be moved in a continuously adjustable manner from an open position into a closed position.

FIG. 1 shows a first embodiment of the vehicle air conditioner 10, in which the control element 44 for adjusting the cold air stream is provided in the cold air duct 28 between the evaporator 12 and a duct-branching point 50. The function of the local lowering of the temperature for the entire vehicle interior 16 can be activated of deactivated centrally with said control element 44.

In the first embodiment according to FIG. 1, a nonreturn valve 52 is furthermore provided in the second cold-air partial duct 38, said nonreturn valve taking up an open position in the event of an air stream in the direction of the rear region 26 of the vehicle interior 16 and a closed position in the event of an opposed air stream. As a result, in particular when the control element 44 is closed, an undesirable air flow from the rear region 26 of the vehicle interior 16 into the front region 22 of the vehicle interior 16 is prevented.

FIG. 2 shows a second embodiment of the vehicle air conditioner 10, in which the two control elements 46, 48 are provided instead of the control element 44 and the nonreturn valve 52. The control element 46 is provided in the first cold-air partial duct 36 and the control element 48 is provided in the second cold-air partial duct 38, in order to adjust the respective cold air stream. In this manner, the function of the local lowering of the temperature for the front region 22 of the vehicle interior 16 and the front region 26 of the vehicle interior 16 can be activated or deactivated independently of each other.

The invention claimed is:

1. A vehicle air conditioner, comprising:
   an evaporator for supplying cold air which is fed to a vehicle interior;
   an air-mixing region which is connected downstream of the evaporator and supplies mixed air at a predeterminable temperature;
   a first ventilation duct which is connected to the air-mixing region and conducts mixed air from the air-mixing region into a front region of the vehicle interior; and
   a second ventilation duct which is connected to the air-mixing region and conducts mixed air from the air-mixing region into a rear region of the vehicle interior,
   wherein, in addition, a separate cold air duct, directly fed from the evaporator, which feeds cold air to the vehicle interior in unmixed form is provided;
   wherein at least one control element for adjusting the cold air stream is provided in the cold air duct.

2. The vehicle air conditioner according to claim 1, wherein the cold air duct branches into a first cold-air partial duct which conducts cold air from the evaporator into the front region of the vehicle interior, and into a second cold-air partial duct which conducts cold air from the evaporator into the rear region of the vehicle interior.

3. The vehicle air conditioner according to claim 2, wherein the second cold-air partial duct extends downwards in the region of a central console of the vehicle and rearwards in a central tunnel of the vehicle into the rear region of the vehicle interior.

4. The vehicle air conditioner according to claim 2, wherein a control element for adjusting the cold air stream is provided in the cold air duct between the evaporator and a duct-branching point.

5. The vehicle air conditioner according to claim 2, wherein a control element for adjusting the cold air stream is provided in the first cold-air partial duct.

6. The vehicle air conditioner according to claim 2, wherein a control element for adjusting the cold air stream is provided in the second cold-air partial duct.

7. The vehicle air conditioner according to claim 2, wherein a nonreturn valve is provided in the second cold-air partial duct.

8. The vehicle air conditioner according to claim 1, wherein, in order to heat air which is fed to a vehicle interior, a heating device which supplies warm air and feed the latter to the air-mixing region is provided.

9. The vehicle air conditioner according to claim 8, wherein the heating device is connected downstream of the evaporator.

10. The vehicle air conditioner according to claim 1, wherein a bypass duct which feeds fresh air and/or recycled air to the air-mixing region, bypassing the evaporator, is provided.

11. A vehicle air conditioner, comprising:
an evaporator for supplying cold air which is fed to a vehicle interior;
an air-mixing region which is connected downstream of the evaporator and supplies mixed air at a predeterminable temperature;
a first ventilation duct which is connected to the air-mixing region and conducts mixed air from the air-mixing region into a front region of the vehicle interior; and
a second ventilation duct which is connected to the air-mixing region and conducts mixed air from the air-mixing region into a rear region of the vehicle interior,
wherein, in addition, a separate cold air duct, directly fed from the evaporator, which feeds cold air to the vehicle interior in unmixed form is provided, and
wherein the cold air duct branches into a first cold-air partial duct which conducts unmixed cold air from the evaporator into the front region of the vehicle interior, and into a second cold-air partial duct which conducts unmixed cold air from the evaporator into the rear region of the vehicle interior.

12. A method for locally changing a global temperature setting in a vehicle, comprising:
feeding cold air to the vehicle interior in a separate cold air duct in unmixed form directly from the evaporator by the vehicle air conditioner of claim 11.

* * * * *